US006574529B1

(12) United States Patent
Lundeen et al.

(10) Patent No.: US 6,574,529 B1
(45) Date of Patent: Jun. 3, 2003

(54) SYSTEM FOR AUTOMATIC ALIGNMENT CALIBRATION OF A DATA STORAGE LIBRARY

(75) Inventors: Richard A. Lundeen, Eden Prairie, MN (US); Gerard N. Weisensel, Savage, MN (US); Lyndon J. Hanson, St. Louis Park, MN (US); Glendon D. Kappel, Eagan, MN (US)

(73) Assignee: Plasmon IDE, Inc., Eden Prairie, MN (US)

( * ) Notice: Subject to any disclaimer, the term of this patent is extended or adjusted under 35 U.S.C. 154(b) by 0 days.

(21) Appl. No.: 09/663,405

(22) Filed: Sep. 15, 2000

(51) Int. Cl.[7] .................................................. G06F 7/00
(52) U.S. Cl. ........................ 700/218; 700/214; 700/259; 414/274
(58) Field of Search ................................. 700/213, 214, 700/218, 258, 259; 414/274, 273

(56) References Cited

U.S. PATENT DOCUMENTS

| 4,908,777 A | * 3/1990 | Wolfe ........................... 364/513 |
| 4,979,135 A | * 12/1990 | Moy ........................ 364/571.01 |
| 5,303,034 A | * 4/1994 | Carmichael et al. ......... 356/375 |
| 5,357,495 A | * 10/1994 | Solhjell ......................... 369/34 |
| 5,377,121 A | * 12/1994 | Dimitri et al. ............... 364/478 |
| 5,403,140 A | * 4/1995 | Carmichael et al. ......... 414/280 |
| 5,416,914 A | * 5/1995 | Korngiebel .................. 395/425 |
| 5,418,732 A | * 5/1995 | McFadin ...................... 364/478 |
| 5,426,581 A | * 6/1995 | Kishi et al. .............. 364/167.01 |
| 5,450,385 A | * 9/1995 | Ellis et al. ...................... 369/34 |
| 5,661,287 A | * 8/1997 | Schaefer ....................... 253/383 |
| 5,764,615 A | * 6/1998 | Ware et al. .................. 369/178 |
| 5,790,338 A | * 8/1998 | Kanai et al. ................... 360/71 |
| 5,898,593 A | * 4/1999 | Baca et al. ............. 364/478.02 |
| 5,946,160 A | * 8/1999 | Ohashi ......................... 360/92 |
| 6,005,734 A | * 12/1999 | Shimada et al. ............... 360/69 |
| 6,008,964 A | 12/1999 | Goodnight et al. |
| 6,058,337 A | * 5/2000 | Akiyama et al. ............ 700/218 |
| 6,192,294 B1 | * 2/2001 | Chiba .......................... 700/214 |
| 6,213,705 B1 | * 4/2001 | Wilson ......................... 414/274 |
| 6,330,489 B1 | * 12/2001 | Iwakawa ..................... 700/218 |
| 6,370,444 B1 | * 4/2002 | Kusunoki .................... 700/214 |

* cited by examiner

Primary Examiner—Khoi H. Tran
(74) Attorney, Agent, or Firm—Schwegman, Lundberg, Woessner & Kluth, P.A.

(57) ABSTRACT

Calibrating alignments of a data storage library includes determining an alignment offset by aligning an emitter attached to a media transport assembly (MTA) with a reference location located at a storage area, determining a sensor offset by aligning a sensor attached to the MTA with a reference target located at the storage area, wherein the sensor offset is a function of the alignment offset, and determining a specific offset by aligning the sensor with a specific target, wherein the specific offset is a function of the sensor offset, wherein the specific offset is used to determine an actual position of a specific location located near the specific target.

21 Claims, 11 Drawing Sheets

SYSTEM FOR AUTOMATIC ALIGNMENT CALIBRATION OF A DATA STORAGE LIBRARY

TECHNICAL FIELD OF THE INVENTION

The present invention relates generally to data storage, and in particular to automatic data storage library.

BACKGROUND OF THE INVENTION

Data storage library systems are electro-mechanical devices which contain multiple drives and pieces of data storage media to accommodate installations requiring mass data storage. Media cartridges are stored in columnar arrays to facilitate picking and placing from the storage slots into designated readable/writable drive subsystems. In order to provide accurate and reliable picking and placing of the cartridges, mechanical calibration must take place. The calibration may be required numerous times during the life of the library to compensate for system wear and degradation or if a system is moved to a new location.

Conventional means of mechanical calibration require human intervention and time consuming adjustments to insure that the proper alignments will yield reliable operation. This conventional means often result in excessive system downtime which reduces the end-users perceived reliability.

There is a need for a method to calibrate the alignments of data storage libraries such that human intervention of alignment calibration is eliminated.

SUMMARY OF THE INVENTION

The present invention provides a method for automatic alignment calibration of a data storage library. The method eliminates human intervention of the alignment calibration.

In one aspect, a data storage library is provided. The data storage library includes a storage area including at least one reference location, at least one reference target, at least one specific target, and a media transport assembly (MTA) located near the storage area. The data storage library also includes a sensing system. Furthermore, the data storage library includes means for positioning the MTA to enable the sensing system to perform a calibrating alignment of the data storage library.

Another aspect provides a method of calibrating alignments of a data storage library. The method includes determining an alignment offset by aligning an emitter with a reference location. The method also includes determining a sensor offset by aligning a sensor with a reference target, wherein the sensor offset is a function of the alignment offset. The method further includes determining a specific offset by aligning the sensor with a specific target, wherein the specific offset is a function of the sensor offset, wherein the specific offset is used to determine an actual location of a specific location located near the specific target.

DETAILED DESCRIPTION OF THE INVENTION

Figure 1:
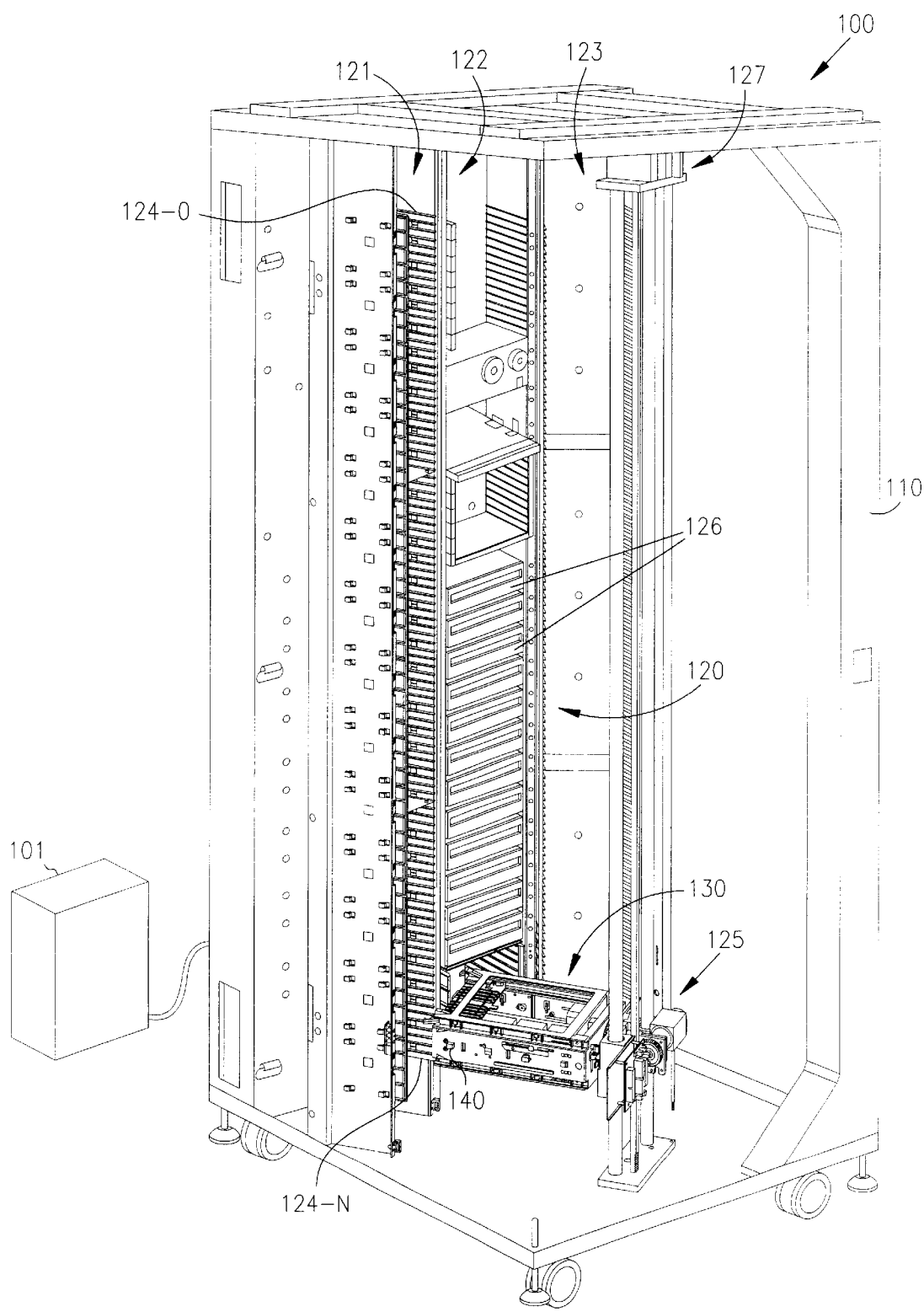
FIG. 1 shows an isometric view of a data storage library according to one embodiment of the present invention.

The following detailed description refers to the accompanying drawings which form a part hereof, and shows by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the invention is defined only by the appended claims FIG. 1 shows an isometric view of a data storage library 100 according to one embodiment of the present invention. Data storage library 100 stores vast amounts of data such as inventory, customer lists, video or audio files, or any other type of storable information. Typically, data storage library 100 is coupled to an external computer or an external controller 101, which directs and controls data searches or requests. In some embodiments, data storage library 100 includes an onboard controller for controlling and requesting data searches and/or read/writes.

Data storage library 100 includes a housing 110, a media storage area 120, a positioning system 125, and media transport assembly (MTA) 130, and a sensing system 140. MTA 130 has various home positions within positioning system 125. During an initial power up or before any calibrating process of library 100, controller 101 instructs positioning system 125 to move MTA 130 through all the home positions before a calibrating process is performed. Since all locations (nominal locations) are predetermined or known before a calibrating process, any nominal location can be approximately located before the calibrating process.

Housing 110 holds the various elements of the data storage library. In the exemplary embodiment, housing 110 is a rectangular, box-shaped housing. Some embodiments include a housing, which completely encloses the members of data storage library 100. Other embodiments incorporate a frame-like housing leaving one or more sides of the library exposed.

Media storage area 120 is located within housing 110. Storage area 120 includes three storage columns 121, 122, and 123. Some embodiments utilize a single storage column, others include four or more storage columns. In the exemplary embodiment, each of the storage columns 121–123 includes a plurality of storage slots 124 0–N arranged vertically within the column. Each of the of storage slots is adapted for holding one or more data storage media. In one embodiment, each slot includes a door covering its front end. In other embodiments, each slot includes an open front end for the loading and unloading of data storage media. Almost any type of data storage media is applicable to the present invention. Exemplary media include tapes, magnetic tapes, CD-ROMS, writable CDS, magneto-optical media, DVD, or other modular, removable media. In various embodiments, the media are contained in cartridges, magazines, or other containers. In addition, besides the storage slots, each of the storage columns 121–123 includes other elements such as media drives 126. In the exemplary embodiment, media drives 126 are located within storage column 122. However, in some embodiments, the media drives 126 are in storage column 121, column 123, or located next to the storage columns. Media drives 126 read and/or write information on the data storage media. In various embodiments, media drives 126 are a tape drive, a CD-ROM drive, an optical media drive, a read only drive, a read/write drive, or other applicable drive which can read the data storage media. Furthermore, besides the storage slots and media drives, each of the storage columns 121–123 might include one or more other elements such as a single-cartridge import/export slot, multiple-cartridge magazine import/export slot, or pass-through cartridge exchange mechanism.

Figure 2:
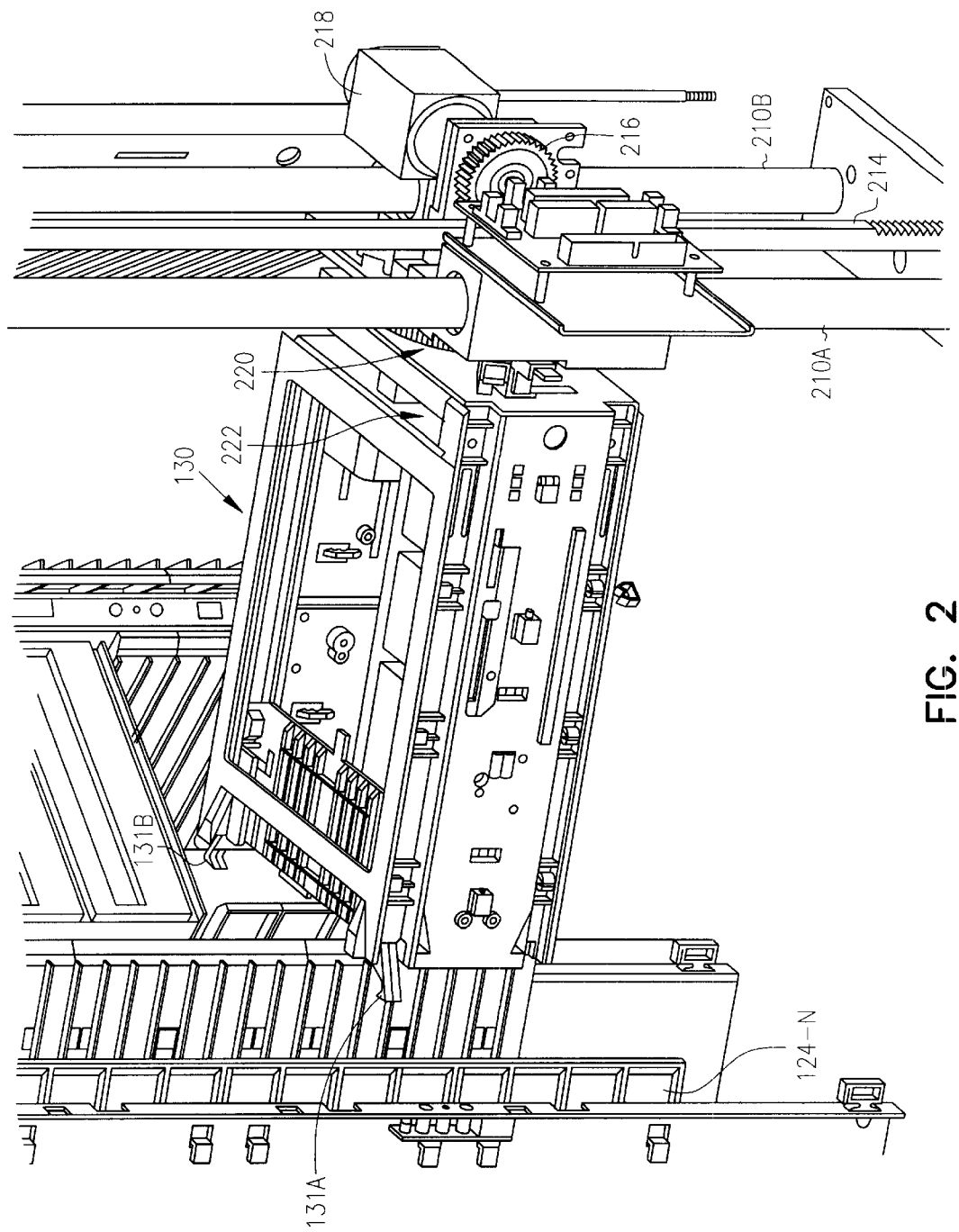
FIG. 2 shows a positioning system of the storage library of FIG. 1.

FIG. 2 shows positioning system 125 of storage library 100 of FIG. 1. Positioning system 125 includes guide members 210a and 210b, a rack 214 and various gear and motor systems. The gear and motor systems includes, a gear 216 and a motor 218, a gear 220 and a motor 222, and a gear-motor system 127 (shown in FIG. 1). Each of the guide members 210a–b is a vertically oriented guide located near the plurality of storage slots 124 0–N. MTA 130 is slidably coupled to guide members 210a–b. MTA 130 transfers or swaps data storage media between storage slots 124 0–N and media drives 126 by using gripper portion 131a–b. In the exemplary embodiment, guide member 210a–b run from the top to the bottom of housing 110 (shown in FIG. 1), thus covering the full height of storage columns 121–123.

Positioning system 125 provides means for positioning MTA 130 through various movements in front of the storage columns 121–123, giving MTA 130 access between the slots 124 0–N of the storage columns. The various movements include a vertical movement, a first angular movement, and a second angular movement.

Figure 3:
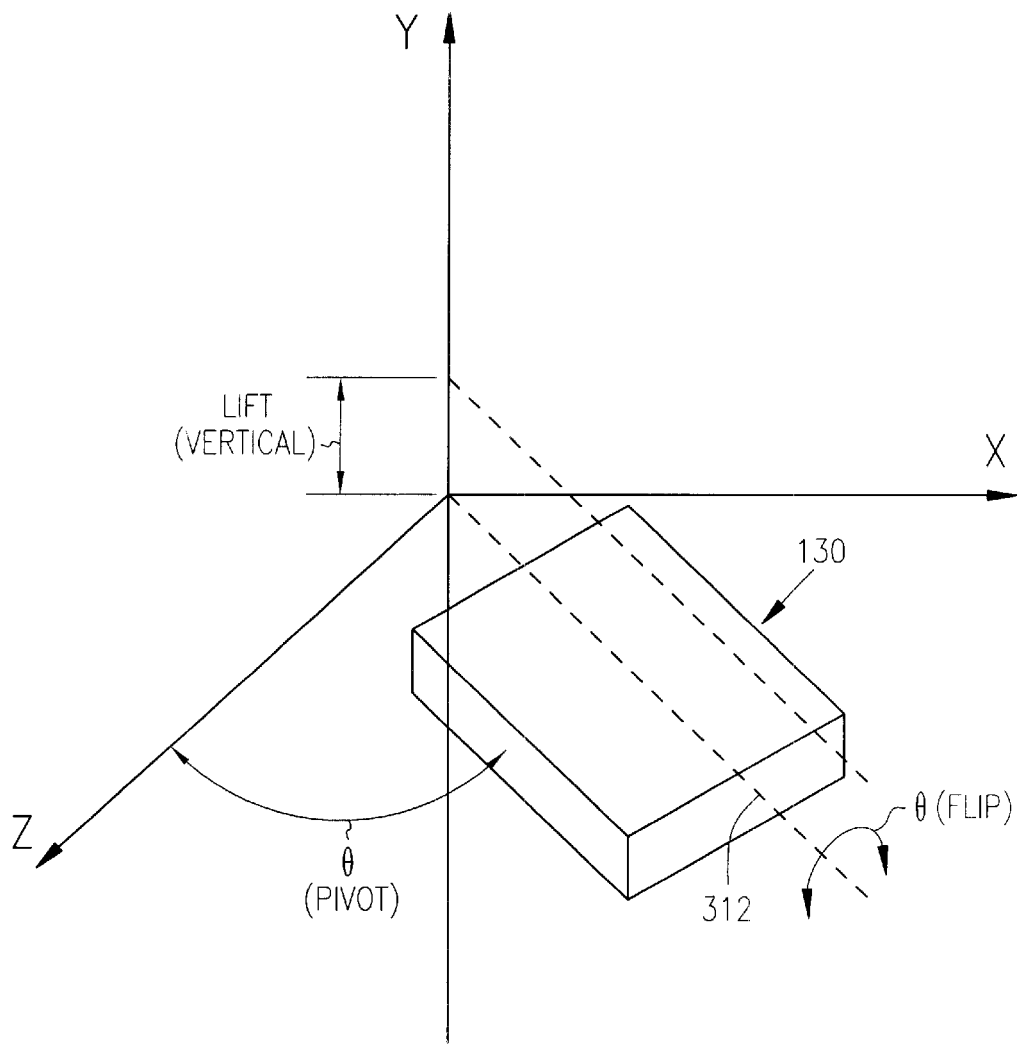
FIG. 3 shows various movements of a media transporting assembly of FIG. 1.

FIG. 3 shows various movements of MTA 130. In a vertical movement (lift movement), MTA 130 moves linearly in the vertical direction (y-axis), which is parallel to guide members 210a–b. In a first angular movement (θ movement), MTA 130 moves angularly to the left and right about the y-axis and on horizontal x-z plane, which is perpendicular to y-axis. In a second angular movement (φ movement), MTA 130 moves angularly about an axis 312, which is perpendicular to the y-axis. In this movement, MTA 130 flips or rotates around axis 312 to accommodate two-sided media. From this point forward, the vertical movement will be referred to as the lift movement, the first angular movement will be referred to as the pivot movement, and the second angular movement will be referred to as the flip movement.

Each of the MTA movements has a home position. Thus, three home positions include a lift home position, a flip home position and a pivot home position. Each home position can arbitrarily located anywhere along positioning system 125.

Referring to FIG. 2, rack 214, gear 216 and motor 218 provides means for MTA 130 to move through the lift movement. Gear 220 and motor 222 provide means for MTA 130 to move through the flip movement. Gear-motor system 127 provides the pivot movement. In one embodiment, motor 218 is a brushless DC motor fitted with a quadrature encoder for accurate positioning and speed profiling. Motor 220 is a stepper motor. Gear-motor system 127 also includes a stepper motor. Different motor types can be substituted based on the system performance and accuracy specifications. In some other embodiments, motor 218 can be replaced by a stepper motor.

Figure 4A:
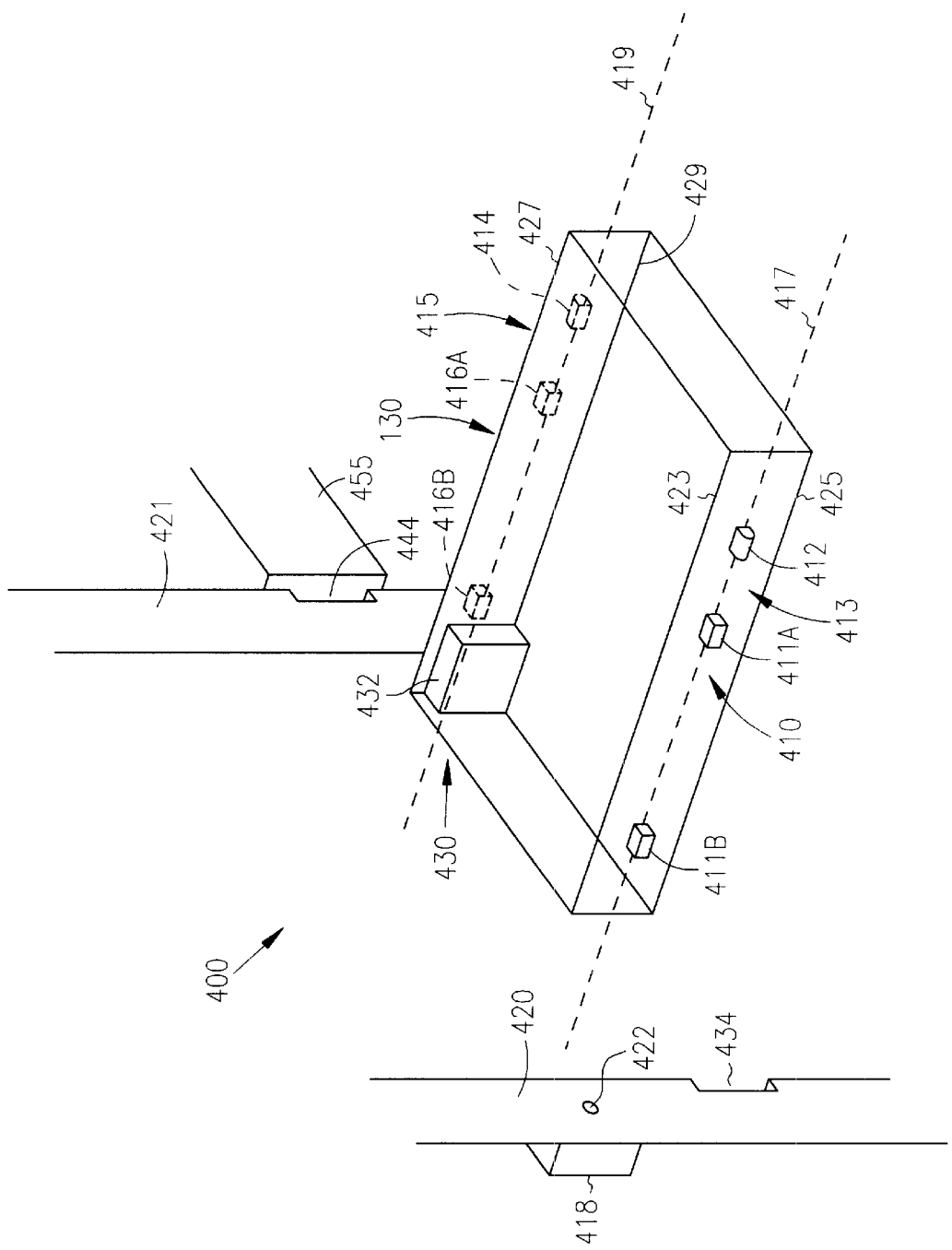
FIG. 4A shows a sensing system of the data storage library of FIG. 1.

FIG. 4A shows a sensing system 400 of data storage library 100 of FIG. 1. Sensing system 400 can comprise any type of sensors and compatible targets that provide suitable position detection capabilities, including but not limited to photo-electric, optical, magnetic, inductive, or capacitive sensor technologies. In FIG. 4A, sensing system 400 includes a first sensing system 410 and a second sensing system 430. First sensing system 410 includes a first reference emitter 412 and a second reference emitter 414. Reference emitters 412 and 414 are located on sides 413 and 415 of MTA 130, respectively. Each of the reference emitters 412 and 414 is aimed through a set of apertures 411a–b or 416a–b at known locations on MTA 130 to produce beams of light that are accurately aligned with MTA 130. Emitter 412 and apertures 411a–b are located along center line 417, which is the center between top edge 423 and bottom edge 425. Similarly, emitter 414 and apertures 416a–b are located along center line 419, which is the center between top edge 427 and bottom edge 429. Sensing system 410 also includes a reference detector 418, which is placed behind a column flange 420. The column flange 420 has a small reference detector hole 422 drilled in it directly in front of reference detector 418 to allow only light from directly in front of reference detector 418 to reach the reference detector 420. Hole 422 serves as a reference location whose nominal location within storage library 100 is known.

Reference emitters 412 and 414 are first used to set the flip offset and determine any asymmetries in the flip motion. Then an alignment location is determined at one of the flip positions. Once the center of the reference detector hole 422 is aligned with the beam of light from a chosen reference emitter 412 or 414, the library alignment offset at that location can be determined.

Second sensing system 430 includes a reflective sensor 432 located in front area of MTA 130 and a reference target 434 located on column flange 420. In FIG. 4A, reference target 434 is a three-sided punchout (hole) on column flange 420. In another embodiment, reference target 434 is a rectangular punchout or four-sided punchout. In other embodiments, target 434 can be any shape such as rectangle, square, triangle, diamond, circle, etc. Reference target 434 serves as a reference target location whose nominal location within storage library with respect to the reference detector hole 422 is known. Finding the sensed reference target 434 location after locating the reference detector hole 422 allows any misalignment of reflective sensor 432 to be determined. This eliminates the need to accurately align the reflective sensor 432. Reflective sensor 432 contains an emitter and detector in the same package both facing the same direction, and responds to light reflected off of a surface back to the detector. With reflective sensor 432, two combinations of target and background can be used: a reflective target and a non-reflective background, or non-reflective target and a reflective background.

In addition to reference target 434 of FIG. 4A, library 100 also includes other specific targets which can be placed anywhere within the library. For simplicity, only one specific target is shown in FIG. 4A. Specific target 444 is located near drive 455 on column flange 421. A specific target, such as target 444, serves as a calibrating mark for determining offsets of a specific location, such as drive 455, near the specific target.

In FIG. 4A, since reference target 434 is a punchout, it is not reflective. The background is column flange 420, which is preplated sheet metal, thus, it is a reflective material. In other embodiments, other targets and backgrounds can be used. Plastics can be made from different materials with different surface finishes to achieve either a reflective or non-reflective surface. Paper stickers of various types of paper with various types of ink may also be used as targets and backgrounds. Furthermore, material can be manufactured at an angle that will redirect the emitted light away from reflective sensor 432, thus the material will appear as a non-reflective surface.

Referring to sensing system 400 of FIG. 4A, in some embodiments, reflective sensor 432 is eliminated. Thus, reference emitter 412 is dual purpose. The first purpose is to align with the reference detector 418 behind hole 422 located on column flange 420. The second purpose is to replace the emitter that would have come from the reflective sensor 432. Another detector (phototransistor) is attached to MTA 130 near reference emitter 412 beam path and facing toward the column 420. This detector (MTA detector) replaces the detector of reflective sensor 432. The MTA detector will receive whatever portion of the reference emitter signal is reflected. In some embodiment, the MTA detector is fed into an analog-digital converter, or the reference emitter and MTA detector is connected to a controller to support using a modulated signal. Furthermore, in some embodiments, if the flip movement of MTA 130 is not used, one of the emitters 412 or 414 is eliminated.

Figure 4B:
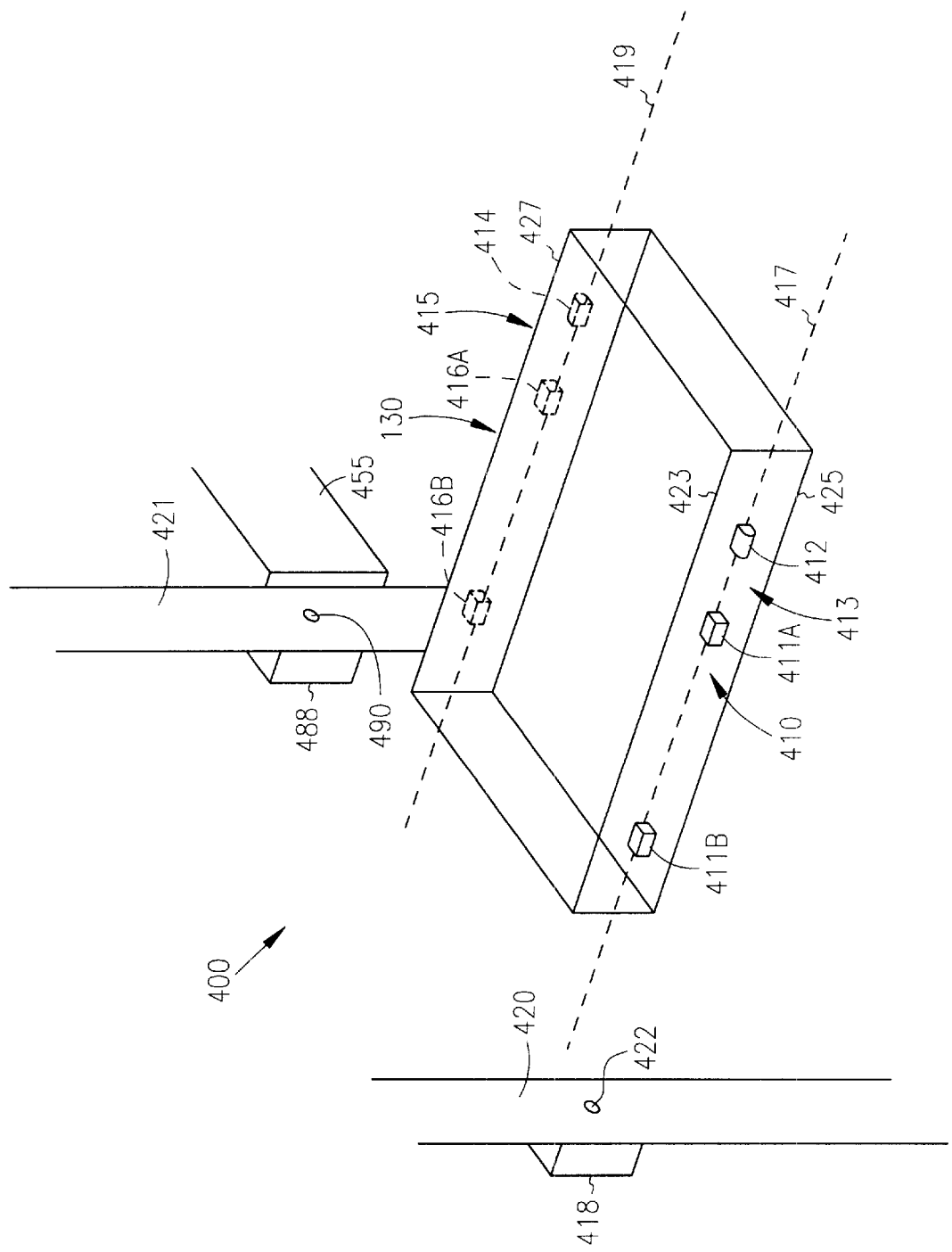
FIG. 4B shows another sensing system of the data storage library of FIG. 1.

FIG. 4B shows another embodiment of sensing system 400 of data storage library 100 of FIG. 1. In this embodiment, reflective sensor 432 and reference target 434 are eliminated; and at least one reference detector is included. In this case, the reference detector is used to calculate the offset of all locations within library 100. For example, reference detector 488 and hole 490 can be used to calculate the offset of drive 455.

Figure 4C:
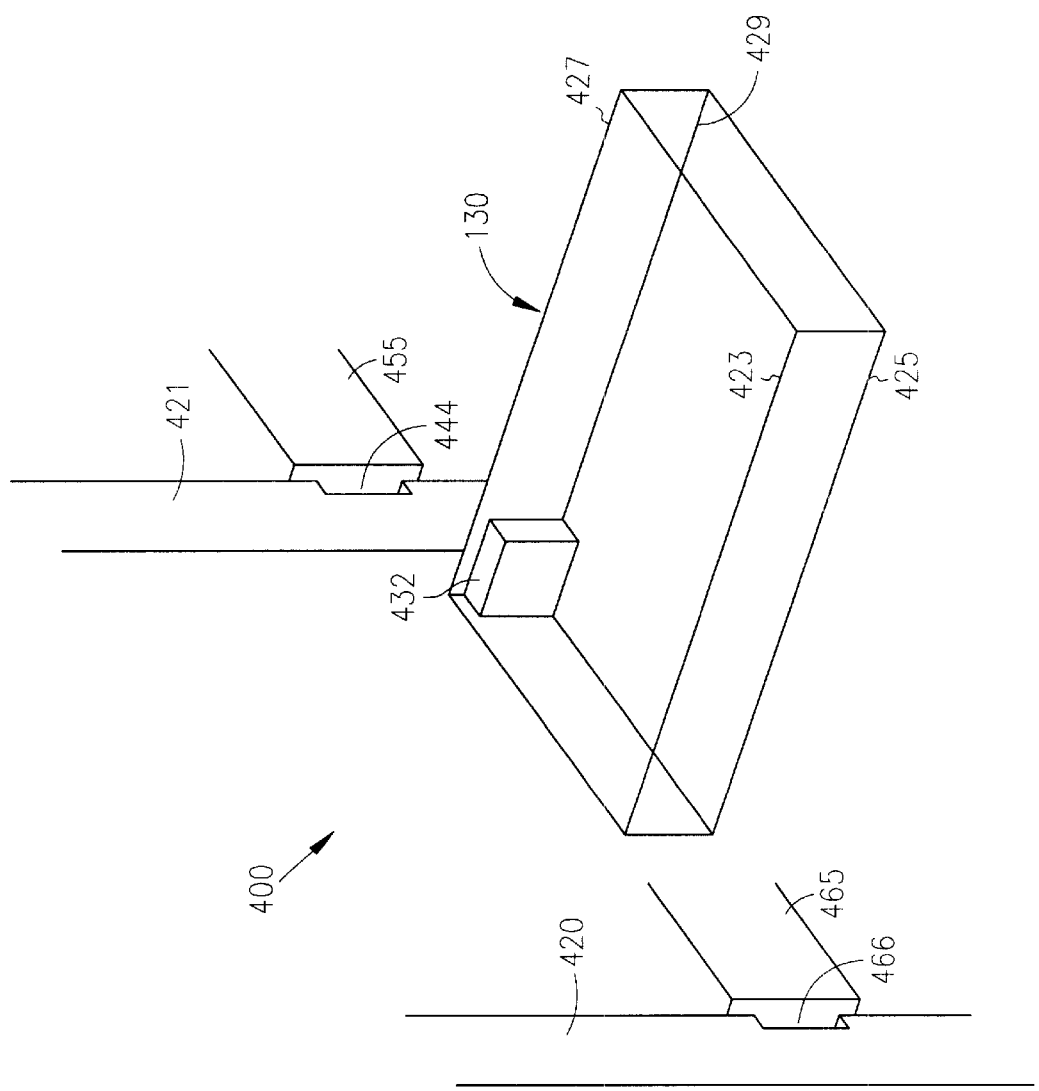
FIG. 4C shows another sensing system of the data storage library of FIG. 1.

FIG. 4C shows another embodiment of sensing system 400 of data storage library 100 of FIG. 1. In this embodiment, reference emitters 412 and 414 and reference detector 418 are eliminated; and one or more targets are included. In this case, MTA 130 can be built on a fixture, and reflective sensor 432 is accurately aligned to a preset location. After reflective sensor 432 is accurately aligned, offsets of locations within library 100 can be determined by finding the offsets of corresponding targets located near those locations. For example, offsets of drive 455 can be determined by calculating the offsets of a nearby target 444. Offsets of drive 455 can be determined by calculating the offsets of a nearby target 466.

Figure 5:
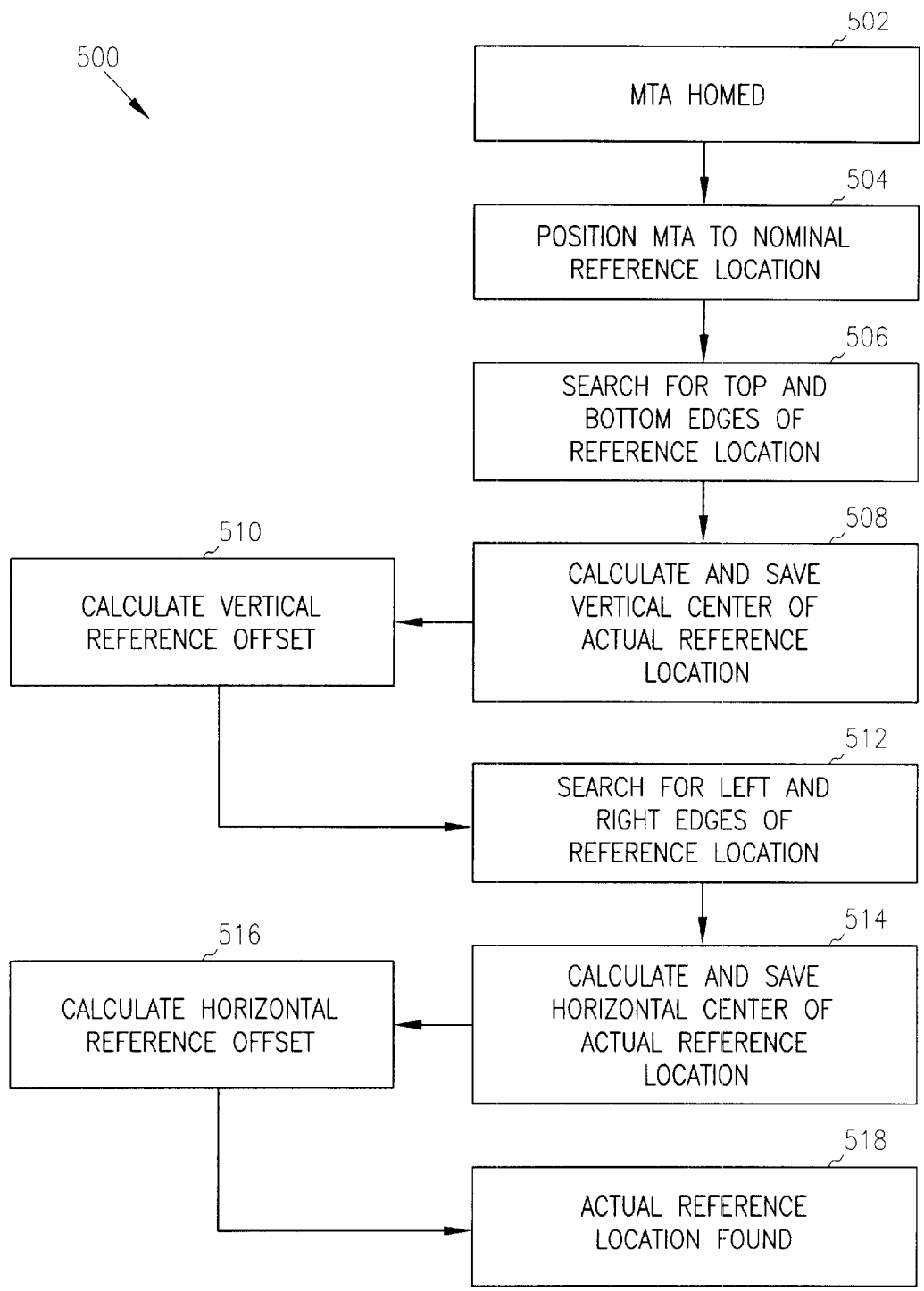
FIG. 5 is a flow chart illustrating a method of determining alignment offsets within the data storage library of FIG. 1.

FIG. 5 is a flow chart illustrating a method 500, which determines an alignment offset and an actual location of a reference location within the data storage library 100 of FIG. 1 with respect to MTA 130. In general, method 500 involves aligning a light beam generated from emitter 412 to a center of the reference location located in storage area 120. In this case, the reference location is hole 422 located in front of reference detector 418 (shown in FIG. 4A.) When the light beam and the center of hole 422 are lined up, the actual location of hole 422 (the reference location) is found with respect to the MTA position.

At step 502, positioning system 125 has already moved MTA 130 through the lift, flip and pivot home positions. In other words, MTA 130 is already homed. The order of the home positions in which MTA moved through is arbitrary. At 504, MTA 130 is positioned to a nominal location of hole 422. At step 506, positioning system 125 causes MTA 130 to move in a predetermined pattern according to a predetermined search algorithm. In this step, MTA 130 moves in the lift and pivot movements to search for top and bottom edges of hole 422. At step 508, after the top and bottom edges are found, the actual vertical value of the center of hole 422 is calculated and stored. At step 510, a calculation is also performed to determine vertical difference between vertical values (vertical parameters) of the nominal and actual vertical locations of hole 422. The vertical difference is referred herein as vertical reference offset. At step 512, MTA 130 searches for left and right edges of hole 422. At step 514, after the left and right edges are found, the actual horizontal value of the center of hole 422 is calculated and stored. At step 516, a calculation is performed to determine horizontal difference between horizontal values (horizontal parameters) of the nominal and actual horizontal locations of hole 422. The horizontal difference is also referred to as horizontal reference offset. At step 518, the alignment offsets (vertical reference offset and horizontal reference offset) are determined; the actual location of the reference location (hole 422) is also found.

Figure 6A:
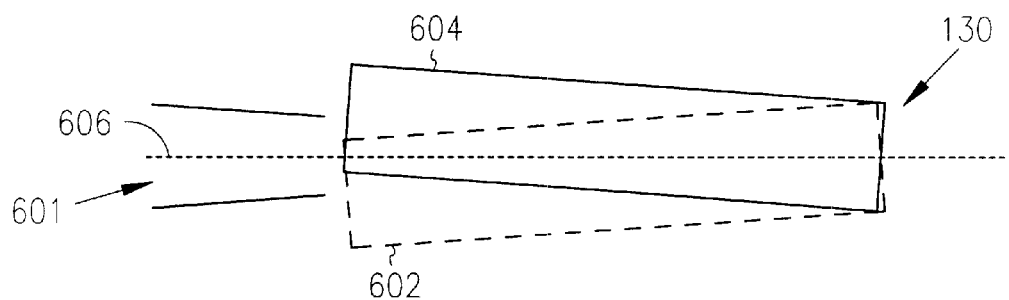
FIGS. 6A–B show exemplary flip movements offsets of MTA 130.
Figure 6B:
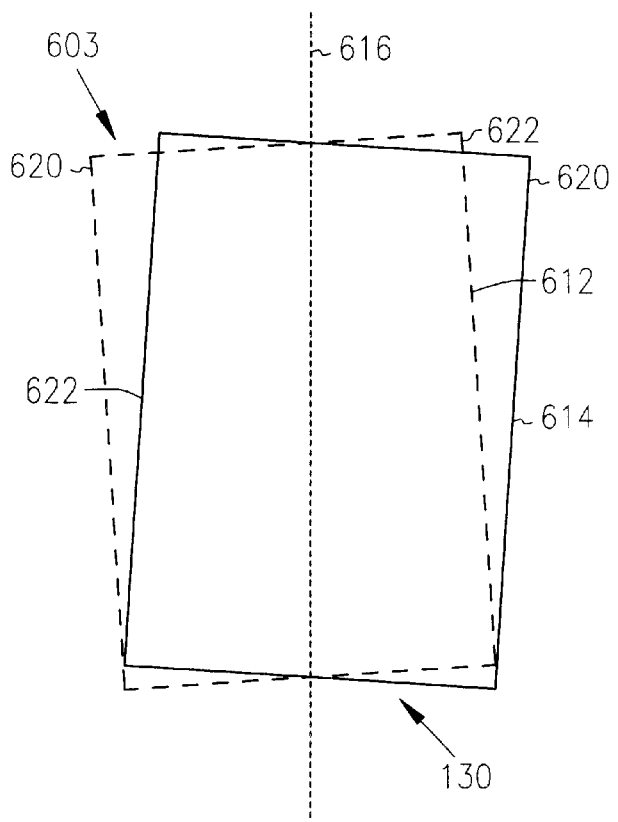

The calculations of the reference offsets are as follows:

Vertical Reference Offset=Actual Vertical Reference Location–Nominal Vertical Reference Location Horizontal Reference Offset=Actual Horizontal Reference Location–Nominal Horizontal Reference Location FIGS. 6A–B show exemplary flip movement offsets of MTA 130. The flip movement offsets include a MTA droop offset 601 and a MTA skew offset 603. FIG. 6A shows one exemplary of a MTA droop offset. In the Figure, a side view of MTA 130 is shown in different positions. Position 604 represents a current position after MTA 130 has flipped 180 degrees about axis 606, from a previous position 602. In the exemplary embodiment, an offset, indicated as MTA droop 601 occurs when MTA 130 is not horizontal. FIG. 6B shows one exemplary of a MTA skew offset. In the Figure, a plane view of MTA 130 is shown in different positions. Position 614 represents a current position after MTA 130 has flipped 180 degrees, about axis 616, from a previous position 612. In the exemplary embodiment, an offset, indicated as MTA skew offset 603 occurs when edges 620 and 622 do not match after MTA 130 has flipped 180 degrees.

Figure 7:
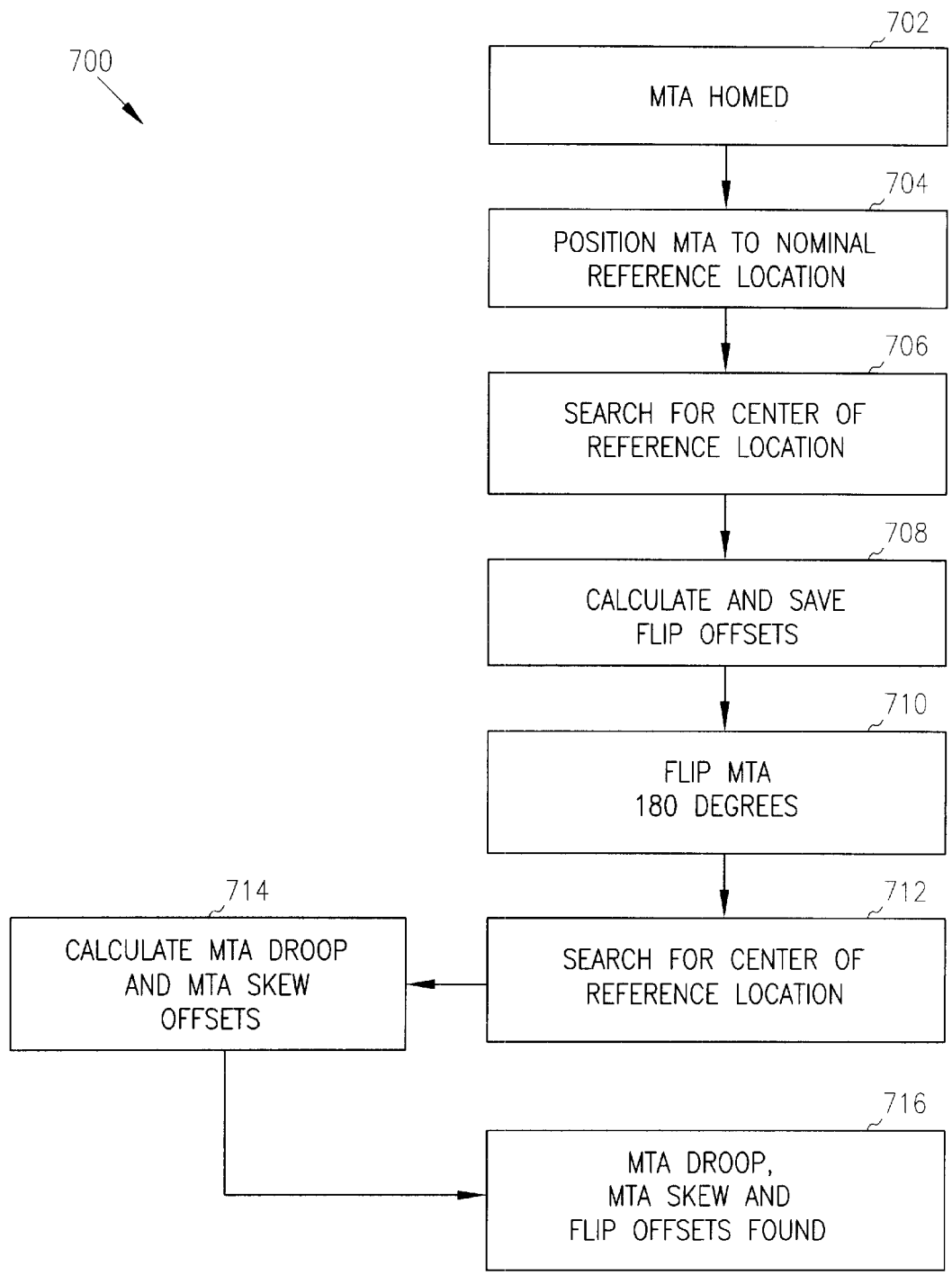
FIG. 7 is a flow chart illustrating a method of determining MTA droop and MTA skew offsets.

FIG. 7 is a flow chart illustrating a method 700 which determines the offset values of MTA droop and MTA skew offsets of MTA 130. In general, method 700 involves aligning a light beam generated from emitter 412 to a center of the reference location located in storage area 120. In this case, the reference location is hole 422 located in front of reference detector 418 (shown in FIG. 4A.) When the light beam and the center of hole are lined up, MTA flips 180 degrees; then the offset values of MTA droop and MTA skew offsets are determined.

At step 702, MTA 130 is already homed. That is MTA 130 has gone through all the home positions. At 704, MTA 130 is positioned to a nominal location of hole 422. At step 706, MTA 130 searches for the actual location hole 422 following the steps similar to steps 506–518 of method 600. At step 708 after the actual location of hole 422 is found, a calculation is performed to determine a flip offset. At step 710, MTA 130 flips 180 degrees. Step 712 is the same as step 706. At step 714, a calculation is performed to determine the MTA droop offset and the MTA skew offset. At step 716, the MTA droop offset and the MTA skew offset are determined. The MTA droop and MTA skew offsets are used only when MTA 130 moves through the flip movement.

Figure 8:
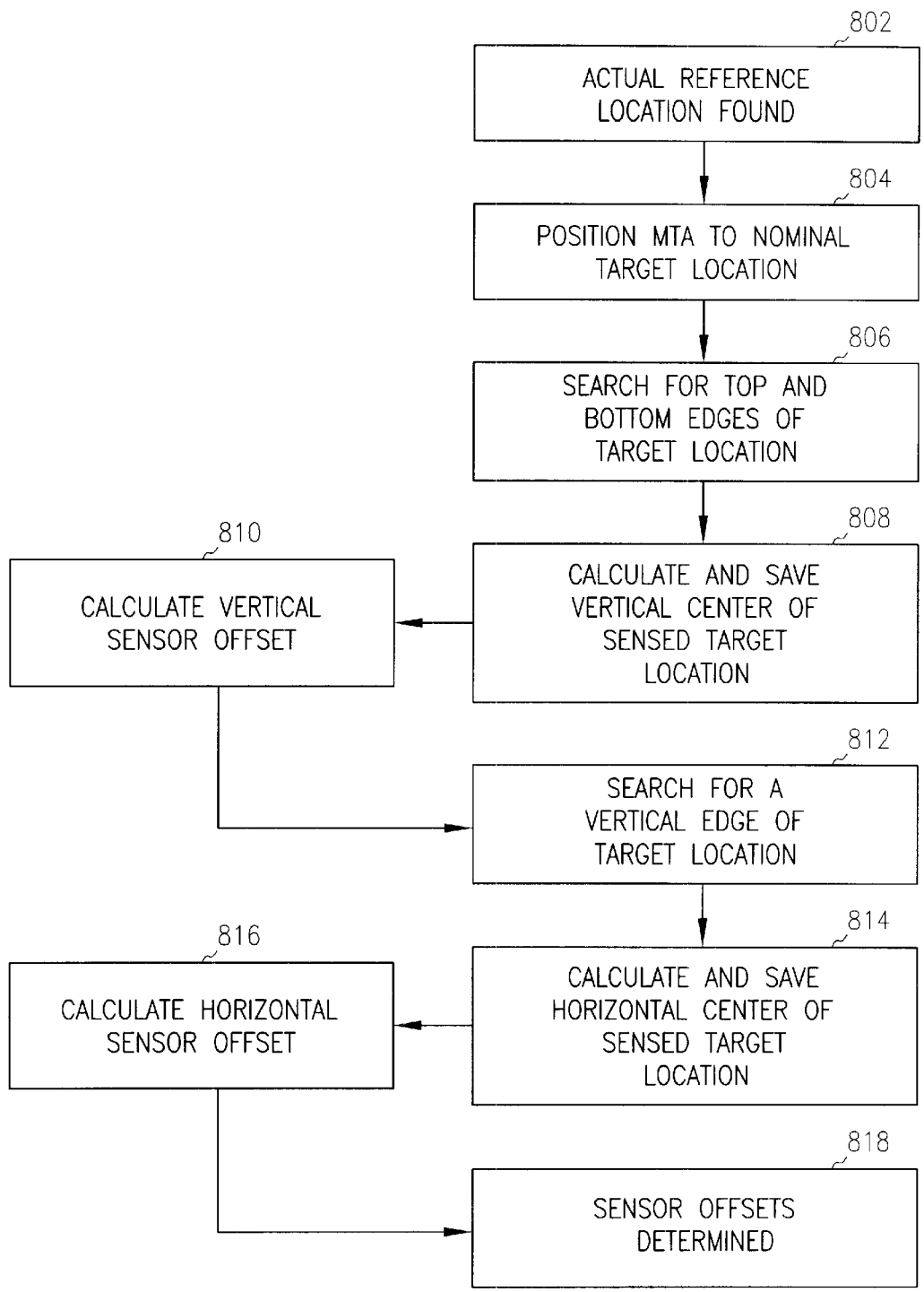
FIG. 8 is a flow chart illustrating a method of determining reflective sensor offsets of storage library 100 of FIG. 1.

FIG. 8 is a flow chart illustrating a method 800, which determines reflective sensor offsets of storage library 100 of FIG. 1. The reflective sensor offsets are calculated after the actual location of reference location (hole 422) with respect to MTA 130 has been found. Method 800 is similar to method 600 with the exception that a reference target location is replacing the reference location (hole 422.) In general, method 800 involves aligning a light beam generated from reflective sensor 432 to a center of the reference target location located in storage area 120. In this case, the reference target location is the location of reference target or punchout 434 located on column flange 420. Reference target 434 is a target preferably near reference location, hole 422 (shown in FIG. 4A.) When the light beam and the center of reference target 434 are lined up, the reflective sensor offset is determined.

At step 802, MTA 130 is positioned at the actual reference location (hole 422) with respect to MTA 130 has been found. At 804, MTA 130 is positioned to a nominal location of reference target 434. At step 806, positioning system 125 causes MTA 130 to move in a predetermined pattern according to a predetermined search algorithm. In this step, MTA 130 moves in the lift and pivot movements to search for top and bottom edges of reference target 434. At step 808, after the top and bottom edges are found, the sensed vertical value of the center reference target 434 is calculated and stored. At step 810, a calculation is also performed to determine vertical difference between vertical values (vertical parameters) of the sensed and actual vertical locations of reference target 434. From here, a vertical reflective sensor offset is determined. The Vertical reflective sensor offset equals the difference between vertical values of reference target 434 minus the Vertical reference offset. At step 812, MTA 130 searches for a vertical edge (left edge) of reference target 434. At step 814, after the left edge is found, the sensed and actual horizontal value of the center of reference target 434 is calculated and stored. At step 816, calculation is performed to determine horizontal difference between horizontal values (horizontal parameters) of the sensed and nominal horizontal locations of reference target 434. From here, a horizontal reflective sensor offset is determined. The horizontal reflective sensor offset equals the difference between horizontal values of reference target 434 minus the Horizontal reference offset. At step 518, the reflective sensor offsets (vertical reflective sensor offset and horizontal reflective sensor offset) are determined.

The calculations of the reflective sensor offsets are as follows:

> Vertical Reflective Sensor offset=(Sensed Vertical Location of Reference target near Reference–Nominal Vertical Location of Reference target near Reference)–Vertical Reference Offset
>
> Horizontal Reflective Sensor Offset=(Sensed Horizontal Location of Reference target near Reference–Nominal Horizontal Location of Reference target near Reference)–Horizontal Reference Offset In FIG. 4A, only one reference target (target 434) is shown. However, in some other embodiments, more than one reference targets (multiple reference targets) can be located near a reference location (near hole 422) for use to calculate the reflective sensor offsets. The multiple reference targets provide flexibility in selection of a reference target; thus calculating reflective sensor offsets is not limited or restricted to one reference target. However, when calculating the reflective sensor offsets, only one reference target is selected among the multiple reference targets.

After the reflective sensor offsets are found, an actual location of any element within library system 100 can be calculated based on the reflective sensor offsets. For example, to find the offset of a specific drive (or a specific location,) a specific target is preferably placed near the drive. Since the specific target is near the drive, the offset of the specific target is the same as the offset of the drive. The offset of the specific target is calculated using a method similar to method 800. After the offset of specific target is found, the actual location of the drive near that target is calculated by factoring in the offset of that target.

Figure 9:
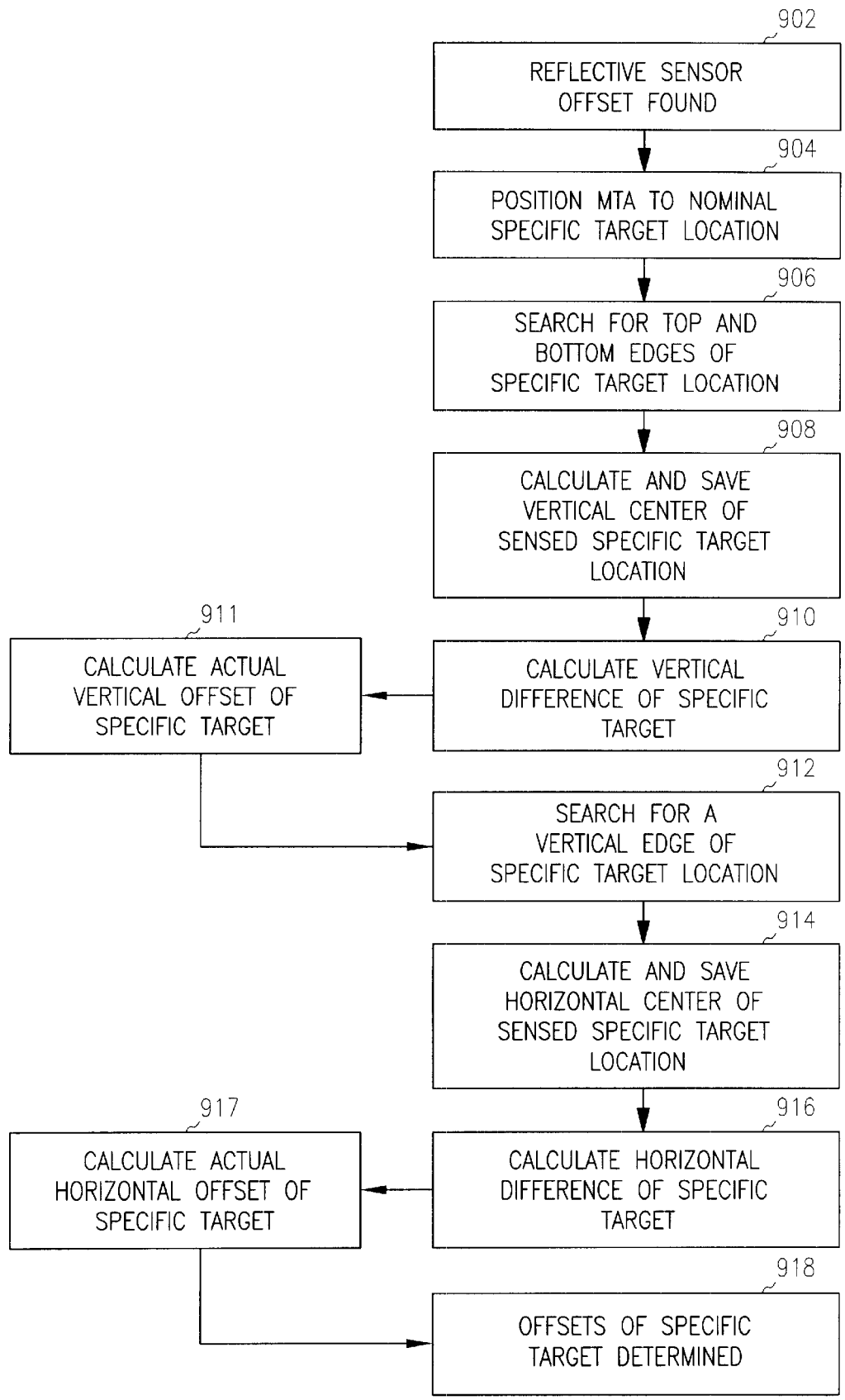
FIG. 9 is a flow chart illustrating a method of determining specific offsets of storage library 100 of FIG. 1.

FIG. 9 is a flow chart illustrating a method 900, which determines offsets of a specific target within the data storage library 100 of FIG. 1. The specific target offsets are calculated after the offsets of the reference target (target 434 in FIG. 4A) have been found. Method 900 is similar to method 800 with the exception that offsets of a specific target location, instead of sensor offsets of a reference target, are being calibrated. In general, method 900 involves aligning a light beam generated from reflective sensor 432 to a center of the specific target location located in storage area 120. In this case, the specific target location is the location of specific target or punchout 444 located on column flange 421. Specific target 444 is a target located near specific location of drive 455 (shown in FIG. 4A.)

At step 902, reflective sensor offset has been found. At 904, MTA 130 is positioned to a nominal location of specific target 444. At step 906, positioning system 125 causes MTA 130 to move in a predetermined pattern according to a predetermined search algorithm. In this step, MTA 130 moves in the lift and pivot movements to search for top and bottom edges of specific target 444. At step 908, after the top and bottom edges are found, the sensed vertical value of the center specific target 444 is calculated and stored. At step 910, a calculation is also performed to determine a vertical difference of specific target 444, which is the difference between vertical values of the sensed and nominal vertical locations of specific target 444. In step 911, the actual vertical offset of specific target 444 is calculated, which equals the vertical difference of specific target 444 minus vertical reflective sensor offset. At step 912, MTA 130 searches for a vertical edge (left edge) of specific target 444. At step 914, after the left edge is found, the sensed horizontal value of the center of specific target 444 is calculated and stored. At step 916, a calculation is performed to determine a horizontal difference of specific target 444, which is the difference between horizontal values of the sensed and nominal horizontal locations of specific target 444. At step 917, the actual horizontal offset of specific target 444 is calculated, which equals the horizontal difference of specific target 444 minus horizontal reflective sensor offset. At step 918, the specific target offsets (vertical and horizontal offsets of specific target 444) are determined.

The calculations of actual offsets for a specific target are as follows:

> Vertical Difference of Specific Target=Sensed Vertical Location of Specific Target near Specific Location–Nominal Vertical Location of Specific Target
>
> Horizontal Difference of Specific Target=Sensed Horizontal Location of Specific Target near Specific Location–Nominal Horizontal Location of Specific Target
>
> Actual Vertical Offset of Specific Target=Vertical Difference of Specific Target–Vertical Reflective Sensor Offset Actual Horizontal Offset of Specific Target=Horizontal Difference of Specific Target–Horizontal Reflective Sensor Offset After offsets of a specific target, such as specific target 444, are determined, offsets of a specific location near the specific target, such as drive 455, can also be determined. Since a specific location is near a specific target, offsets of the specific location are the same as the offsets of the specific target. After actual offsets of a specific location are determined, an actual location of the specific location can also be determined. The actual location of the specific location is the difference between the nominal values of the specific location and the offsets. In general, calculations of the actual value of a specific location are as follows:

Actual Vertical Value of Specific Location=Nominal Vertical Value of Specific Location–Actual Vertical Offset of Specific Target near Specific Location Actual Horizontal Value of Specific Location=Nominal Horizontal Value of Specific Location–Actual Horizontal Offset of Specific Target near Specific Location.

In some cases, the points at which the target edges are sensed may change due to factors such as temperature or debris, causing the calculated height of that target to be different from the calculated height of the reference target. In such case, a scale factor may be applied to the calculation of the horizontal center during the search for the vertical edge of the specific target. The scale factor is determined by the difference between the calculated value of the height of the reference target and the calculated value of a specific target.

Although specific embodiments have been illustrated and described herein, it will be appreciated by those of ordinary skill in the art that any arrangement which is calculated to achieve the same purpose may be substituted for the specific embodiment shown. For example, the calibration method of the invention can be used in a library system having a different architecture from of library 100 shown in FIG. 1. MTA 130 can be stationary and other elements such as columns 121–123 and the storage media rotate or move around MTA 130; or MTA 130 can have other movements different from the lift, pivot and flip movements. This application is intended to cover any adaptations or variations of the present invention. Therefore, it is intended that this invention be limited only by the claims and the equivalents thereof.

What is claimed is:

1. A data storage library comprising:
   a storage area including at least one reference location for used to calculate an alignment offset of the data storage library, at least one reference target for used to calculate a sensor offset, and at least one specific target;
   a media transport assembly (MTA) located near the storage area;
   a sensing system; and
   means for positioning the MTA to enable the sensing system to perform a calibrating alignments of the data storage library.

2. The data storage library of claim 1, wherein the storage area further includes a plurality of storage slots, each of the storage slots adapted to hold one or more data storage media.

3. The data storage library of claim 1, wherein the storage area further includes at least one column, the column adapted to hold one or more data storage media.

4. The data storage library of claim 1, wherein the reference location and the reference target are located at nominal positions.

5. The data storage library of claim 1, wherein the reference target is not reflective.

6. The data storage library of claim 1, wherein the MTA has:
   a linear movement along a vertical axis;
   a first angular movement about the vertical axis and on a horizontal plan; and
   a second angular movement about a horizontal axis perpendicular to the vertical axis and through the horizontal plan.

7. The data storage library of claim 1, wherein the MTA further includes a gripper portion for picking a data storage medium from a storage slot and moving the data storage medium between different locations within the data storage library.

8. The data storage library of claim 1 further comprising a controller for controlling the means for positioning to move the MTA between difference positions within the library.

9. A data storage library comprising:
   a storage area including at least one reference location, at least one reference, and at least one specific target;
   a media transport assembly (MTA) located near the storage area;
   a sensing system; and
   means for positioning the MTA to enable the sensing system to perform a calibrating alignments of the data storage library, wherein the sensing system comprises:
      a first sensing system including at least one emitter located at the MTA and one detector located at the reference location; and
      a second sensing system including one sensor located at the MTA for detecting the reference target and at least one specific target.

10. A data storage library comprising:
    a reference location, a reference target and a specific target;
    a sensing system for calibrating alignments within the library, the sensing system including:
       a first sensing system for operating on reference location to determine an alignment offset of the data storage library; and
       a second sensing system for operating on the reference target to determine a sensor offset and for operating on the specific target to determine a specific offset, wherein the sensor offset is a function of the alignment offset, wherein the specific offset is a function of the sensor offset.

11. The data storage library of claim 10, wherein an actual location of a specific location within the library is the difference between the values of a nominal location for the specific location and the specific location offset.

12. The data storage library of claim 10 further includes a reference detector, wherein the reference detector is located at the reference location.

13. The data storage library of claim 10, wherein the reference target is a non-reflective target.

14. The data storage library of claim 13, wherein the reference target includes at least two edges.

15. The data storage library of claim 10, wherein the first sensing system includes at least one emitter, wherein the emitter aligns with the center of the reference location during a calibrating process for determining the alignment offset.

16. The data storage library of claim 10, wherein the second sensing system includes a reflective sensor, wherein the reflective sensor aligns with the center of the reference target during a calibrating process for determining the sensor offset.

17. A data storage library comprising:

a storage area;

a media transport assembly (MTA) located near the storage area;

a sensing system for determining an alignment offset of the data storage library, for determining a sensor offset, and for determine a specific offset of a specific location within the data storage library; and means for positioning the MTA to enable the sensing system to perform a calibrating alignments of the data storage library.

18. The data storage library of claim 17, wherein the sensing system includes:

at least one reference emitter located on the MTA; and at least one reference detector located in the storage area, wherein the reference detector is used to determine specific offsets of specific locations.

19. The data storage library of claim 17, wherein the sensing system includes:

a reflective sensor located on the MTA; and at least one target located in the storage area, wherein the target is used to determine the specific offset of the specific location.

20. The data storage library of claim 19, wherein the sensing system further includes:

at least one reference emitter located on the MTA; and at least one reference location located in the storage area, wherein the reference location is used to determine the sensor offset.

21. The data storage library of claim 20, wherein the sensing system further includes at least one reference location located in the storage area for use to determine the alignment offset.

* * * * *